United States Patent [19]

Kojima

[11] Patent Number: 5,686,941
[45] Date of Patent: Nov. 11, 1997

[54] INFORMATION RECORDING APPARATUS HAVING A VACUUM SYSTEM

[75] Inventor: Yoshiaki Kojima, Saitama-ken, Japan

[73] Assignee: Pioneer Electronic Corporation, Tokyo, Japan

[21] Appl. No.: 711,004

[22] Filed: Sep. 11, 1996

[30] Foreign Application Priority Data

Sep. 22, 1995 [JP] Japan ............... 7-244760

[51] Int. Cl.⁶ ........................... F16J 15/53
[52] U.S. Cl. ............. 346/137; 277/3; 277/15; 277/80
[58] Field of Search ............ 277/3, 2, 15, 28, 277/29, 80; 346/137

[56] References Cited

U.S. PATENT DOCUMENTS

| | | | |
|---|---|---|---|
| 4,376,997 | 3/1983 | Eggers | 346/137 |
| 4,407,518 | 10/1983 | Moskowitz et al. | 277/80 |
| 4,844,138 | 7/1989 | Kokubu | 277/80 |
| 4,898,480 | 2/1990 | Raj et al. | 277/80 |
| 5,108,715 | 4/1992 | Jekat et al. | 277/80 |
| 5,340,122 | 8/1994 | Toboni et al. | 277/80 |

*Primary Examiner*—Scott Cummings
*Attorney, Agent, or Firm*—Nikaido Marmelstein Murray & Oram LLP

[57] ABSTRACT

There is provided an information recording apparatus having a vacuum system. The apparatus includes a vacuum chamber connected with a first evacuator device. An electronic beam producing device is partially enclosed in the vacuum chamber for emitting an electronic beam for recording information on a recording medium. A moving stage is provided in the vacuum chamber for linearly moving the recording medium in a vacuum atmosphere within the vacuum chamber. A spindle is disposed in the vacuum chamber for rotating the recording medium. The spindle is supported on an air bearing and is rotatably driven by a spindle motor. A magnetic fluid seal producing device is provided around the spindle close to the vacuum chamber side. A pressure differential chamber is provided around the spindle close to the air bearing side. The pressure differential chamber is connected with a second evacuator device.

6 Claims, 3 Drawing Sheets

INFORMATION RECORDING APPARATUS HAVING A VACUUM SYSTEM

BACKGROUND OF THE INVENTION

The present invention relates to an information recording apparatus, in particular to an information recording apparatus having a vacuum system where a spindle (main rotary shaft), extending into a vacuum chamber, is rotatably supported on an air bearing communicated with the outside atmosphere.

A master disc for use in producing a CD (compact disc) or other optical disc is required to be manufactured in a highly evacuated atmosphere. In a highly evacuated atmosphere, the master disc is rotated at an extremely high speed while at the same time being irradiated with an electronic beam, so that desired information can he recorded in the master disc. An information recording apparatus for manufacturing such a master disc in the above process is just what the present invention will deal with in the following description.

A conventional information recording apparatus has a spindle for rotating a master disc. Such a spindle is disposed within a vacuum chamber, and is rotatably supported on an air bearing communicated with the outside atmosphere. As a result, a spindle is in fact communicated with the outside atmosphere, hence it is necessary to provide seal means around the spindle to prevent the outside atmosphere from leaking into the vacuum chamber along the periphery surface of the spindle.

There have been known two kinds of seal means to be formed around the spindle to prevent the outside atmosphere from leaking into the vacuum chamber along the periphery surface of the spindle. One is known as magnetic fluid seal, and the other is known as differential evacuation seal.

FIG. 4 is a cross sectional view indicating a magnetic fluid seal for preventing outside atmosphere from leaking into a vacuum chamber. As shown in FIG. 4, a spindle 1 which is a to main rotary shaft, is surrounded by a housing 2 provided with magnetic fluid seal producing means 3 and 4, so that any possible gaps between the spindle 1 and the housing 2 may be filled up with magnetic fluids produced by the magnetic fluid seal producing means 3 and 4. Here, the magnetic fluid seal producing means 3 comprises a magnet 3c, a pair of pole pieces 3b with the magnet 3c therebetween. In this way, a closed magnetic circuit is formed so that a magnetic fluid 3a is generated and maintained in gaps formed between the front ends of the pole pieces 3b and the spindle 1. Accordingly, a sealing condition around the spindle 1 is formed and maintained constantly. The magnetic fluid seal producing means 4 is constructed in the same manner and has exactly the same effect as the magnetic fluid seal producing means 3.

In the prior art shown in FIG. 4, if it is required to obtain a pressure resisting effect of a higher order, it is necessary to provide a great number of magnetic fluid seals. However, since a magnetic fluid has a viscosity, an increase in the number of magnetic fluid seals will cause an increase in the overall viscosity resistance, resulting in a difficulty for the spindle 1 to be rotated in a high speed.

Further, if a pressure differential across a magnetic fluid seal is more than it can withstand, the magnetic fluid seal will be broken. Moreover, if a magnetic fluid seal does not have a sufficient pressure resisting capability, it will also be broken due to an operation mistake in the operation of a vacuum pump or a valve, or due to an unpredictable service interruption (power source interruption). In such a case, it is required to remove the spindle from the vacuum chamber in order to repair the magnetic fluid seal producing means so as to restore a broken magnetic fluid seal. However, such a repair operation is difficult.

FIG. 5 is a cross sectional view indicating a differential evacuation seal for preventing the outside atmosphere from leaking into a vacuum chamber. As shown in FIG. 5, a spindle 1 which is a main rotary shaft, is surrounded by a housing 2 provided with a plurality of pressure differential chambers 5a–5c. These pressure differential chambers 5a–5c are communicated with evacuator means 6a–6c. With the operation of the evacuator means 6a–6c, the pressure differential chambers 5a–5c may be evacuated so as to prohibit the outside atmosphere from leaking into a vacuum chamber. In the prior art shown in FIG. 5, the evacuator means 6a for evacuating the pressure differential chamber 5a which is allowed to he close to the outside atmosphere, may be a rotary pump which is relatively cheap in cost but can only provide a relatively low vacuum. On the other hand, the evacuator means 6c for evacuating the pressure differential chamber 5c which is required to be in a highly vacuum condition, is usually a turbo molecular pump which can provide a relatively high vacuum but is relatively expensive in cost.

Further, in the prior art shown in FIG. 5, since it is necessary to use many vacuum pumps including a turbo molecular pump which is expensive in cost, the total cost for such an information recording apparatus becomes high.

SUMMARY OF THE INVENTION

An object of the present invention is to provide an improved information recording apparatus so as to solve the above-mentioned problems peculiar to the above-mentioned prior arts.

According to the present invention, there is provided an information recording apparatus having a vacuum system, which apparatus comprises a vacuum chamber connected with a first evacuator means, an electronic beam producing means partially enclosed in the vacuum chamber for emitting an electronic beam for recording information on a recording medium, a moving stage provided in the vacuum chamber for linearly moving the recording medium in a vacuum atmosphere within the vacuum chamber, a spindle disposed in the vacuum chamber for rotating the recording medium, said spindle being supported on an air bearing and rotatably driven by a spindle motor, a magnetic fluid seal producing means provided around the spindle close to the vacuum chamber side, a pressure differential chamber provided around the spindle close to the air bearing side, said pressure differential chamber being connected with a second evacuator means.

In one aspect of the present invention, the information recording apparatus includes a first pressure detector means for detecting the pressure within the vacuum chamber, a second pressure detector means for detecting the pressure within the pressure differential chamber, and a protection circuit responsive to the above pressures and capable of controlling these pressures so that a pressure difference between the vacuum chamber and the pressure differential chamber is constantly under a predetermined threshold value. In detail, the predetermined threshold value is a value beyond which a magnetic fluid seal produced by the magnetic fluid seal producing means will be broken.

In another aspect of the present invention, the information recording apparatus further includes a valve means connected between the vacuum chamber and the pressure differential chamber, for allowing or stopping the communication between the vacuum chamber and the pressure differential chamber.

In a further aspect of the present invention, the information recording apparatus is also provided with a control circuit responsive to the pressure within the vacuum chamber and the pressure within the pressure differential chamber, capable of controlling two valve means connected respectively with the vacuum chamber and the pressure differential chamber such that a pressure difference between the two chambers does not exceed about 0.35 atmosphere. In fact, the control circuit is provided to achieve a highly evacuated condition within the vacuum chamber by virtue of sequence control, while at the same time ensuring that a pressure difference between the vacuum chamber and pressure differential chamber does not exceed about 0.35 atmosphere.

The above objects and features of the present invention will become more understood from the following description with reference to the accompanying drawings.

DETAILED DESCRIPTION OF THE PREFERRED EMBODIMENTS

Figure 1:
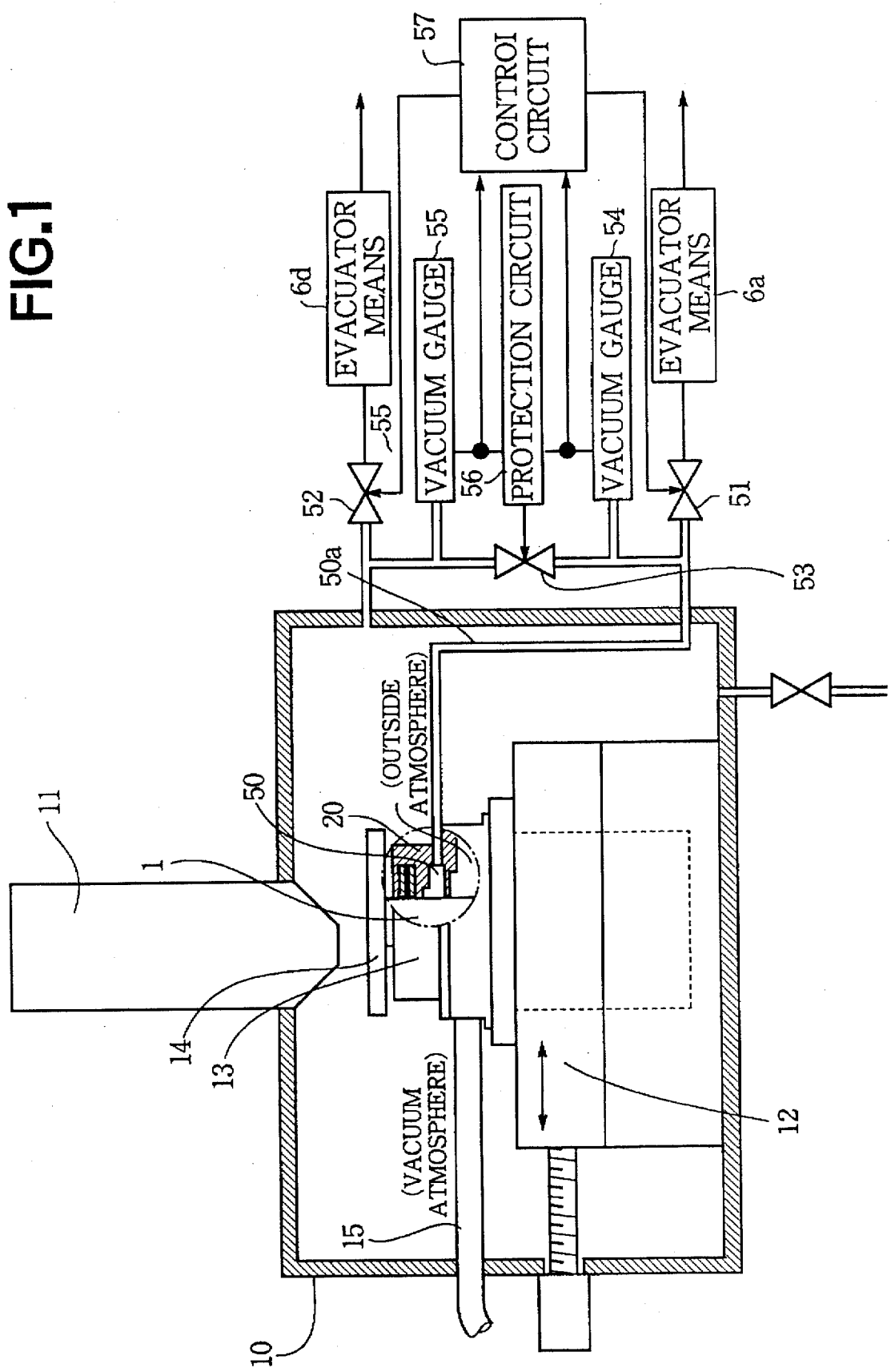
FIG. 1 is an explanatory view schematically illustrating an information recording apparatus according to the present invention.

Referring to FIG. 1, an information recording apparatus of the present invention comprises a vacuum chamber 10 which is highly evacuated, an electronic column 11 for emitting an electronic beam which is used to record information on a master disc, and a moving stage 12 provided in the vacuum chamber 10 for linearly moving a master disc in a vacuum atmosphere within the vacuum chamber 10.

Referring again to FIG. 1, the information recording apparatus has a spindle motor 13 provided on the moving stage 12, a spindle 1 which is a main rotary shaft rotatably driven by the spindle motor 13, and a turn table 14 provided on the top of the spindle 1. The spindle 1 is rotatably supported at its lower end on an air bearing (not shown) which is communicated with outside atmosphere by way of a air supply pipe 15. In this way, the lower end of the spindle 1 becomes communicated with the outside atmosphere.

Figure 2:
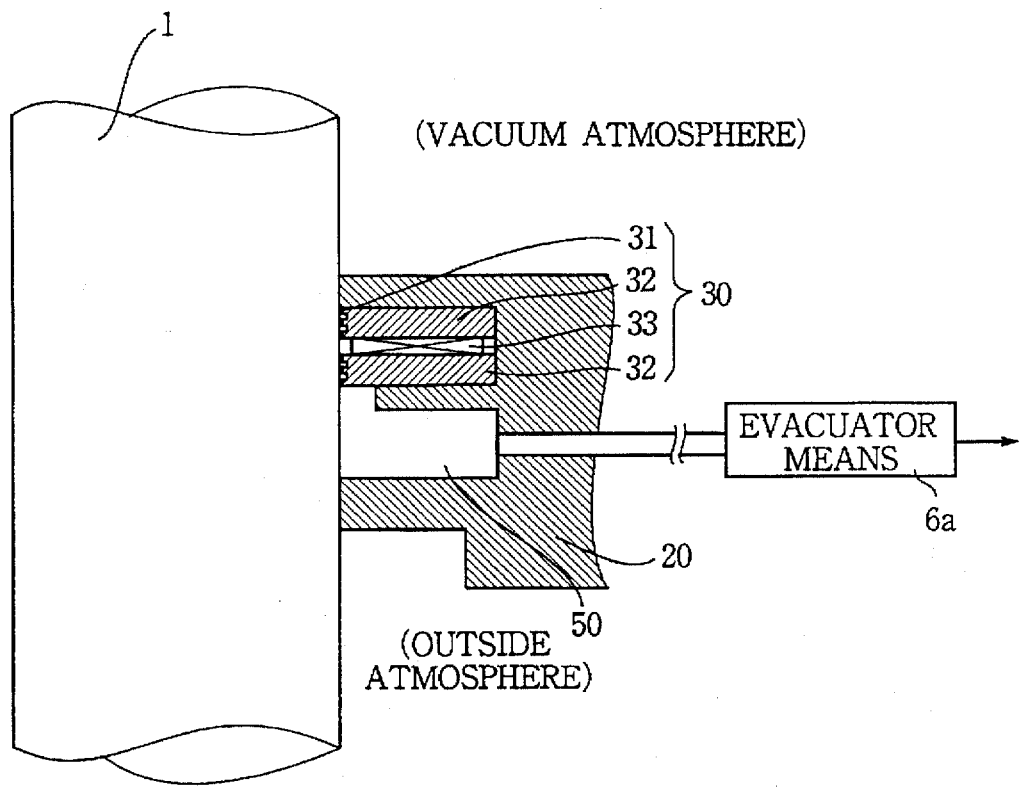
FIG. 2 is an enlarged schematic view illustrating a seal structure of the information recording apparatus of FIG. 1.

Referring to FIG. 2, a housing 20 is provided around the spindle 1. The housing 20 encloses a magnetic fluid seal producing means 30 and a pressure differential chamber 50, both of which are formed circumferentially around the outer periphery of the spindle 1. In such a manner, it is possible to prevent the outside atmosphere on the air bearing side from leaking toward the vacuum side. Thus, the vacuum chamber 10 is exactly sealed off from the outside atmosphere.

Referring again to FIG. 2, the magnetic fluid seal producing means 30 includes a magnet 33, and a pair of pole pieces 32 with the magnet 33 therebetween. In this way, a closed magnetic circuit is formed so that a magnetic fluid 31 is produced and maintained in the gaps formed between the front ends of the pole pieces 32 and the spindle 1. Accordingly, a sealing condition around the spindle 1 is formed and maintained constantly. In the present invention, the magnetic fluid 31 has a thickness less than that of a magnetic fluid in a conventional apparatus, and has a pressure resisting capability which is slightly less than 0.5 atmosphere.

Referring to FIGS. 1 and 2, the pressure differential chamber 50 is communicated through a valve 51 to an evacuator means 6a. With the operation of the evacuator means 6a, the pressure differential chamber 50 may be evacuated to a vacuum condition having an absolute pressure of 0.3 atmosphere.

In order to ensure a highly evacuated condition within the vacuum chamber 10, another evacuator means such as a turbo molecular pump 6d is provided to be communicated through a valve 52 to the vacuum chamber 10. Further, a control circuit 57 is provided to open or close the valves 51 and 52. In detail, the control circuit 57 receives a signal from a vacuum gauge 54 indicating a pressure within the pressure differential chamber 50, and another signal from a vacuum gauge 55 indicating a pressure within the vacuum chamber 10. A pressure difference between the vacuum chamber 10 and the pressure differential chamber 50 may be maintained at a value not more than 0.35 atmosphere by properly opening or closing the valves 51 and 52. In fact, the control circuit 57 is provided to achieve a highly evacuated condition within the vacuum chamber 10 by virtue of sequence control, while at the same time ensuring that a pressure difference between the vacuum chamber 10 and pressure differential chamber 50 does not exceed about 0.35 atmosphere.

Referring to FIG. 1, an exhaust pipe 50a is extending from the pressure differential chamber 50, a valve 53 is provided on the way of the exhaust pipe 50a between the vacuum chamber 10 and the pressure differential chamber 50. In use, the valve 53 may be opened or closed to allow or stop the communication between the vacuum chamber 10 and the pressure differential chamber 50.

Further, a protection circuit 56 is provided which receives signals from the vacuum gauges 54 and 55, respectively indicating a pressure within the pressure differential chamber 50 and a pressure within the vacuum chamber 10, so as to control the opening or closing of the valve 53 in accordance with the detected pressures.

Figure 3:
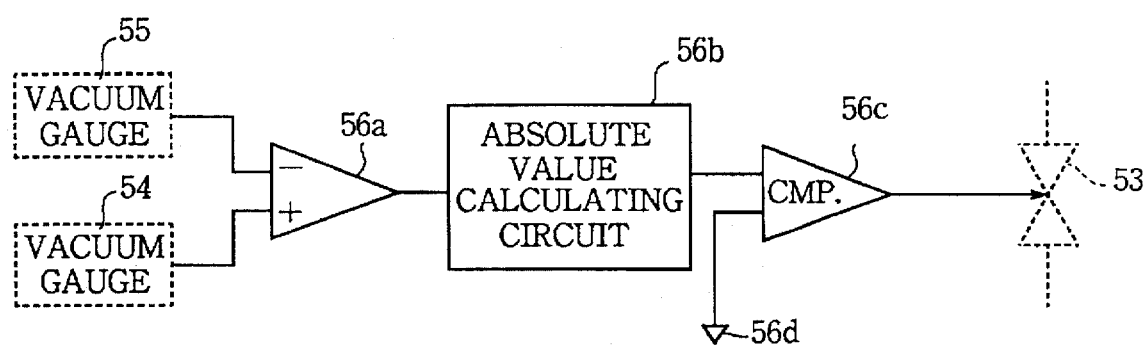
FIG. 3 is a block diagram indicating a protection circuit incorporated in the information recording apparatus of FIG. 1.
Figure 4:
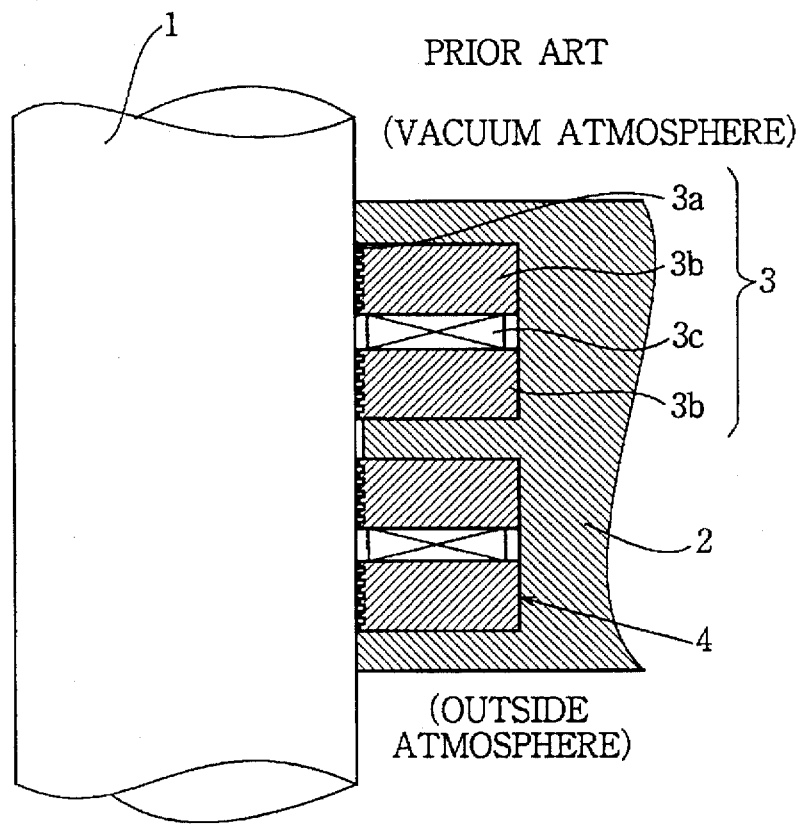
FIG. 4 is an enlarged schematic view illustrating a seal structure of a conventional information recording apparatus.
Figure 5:
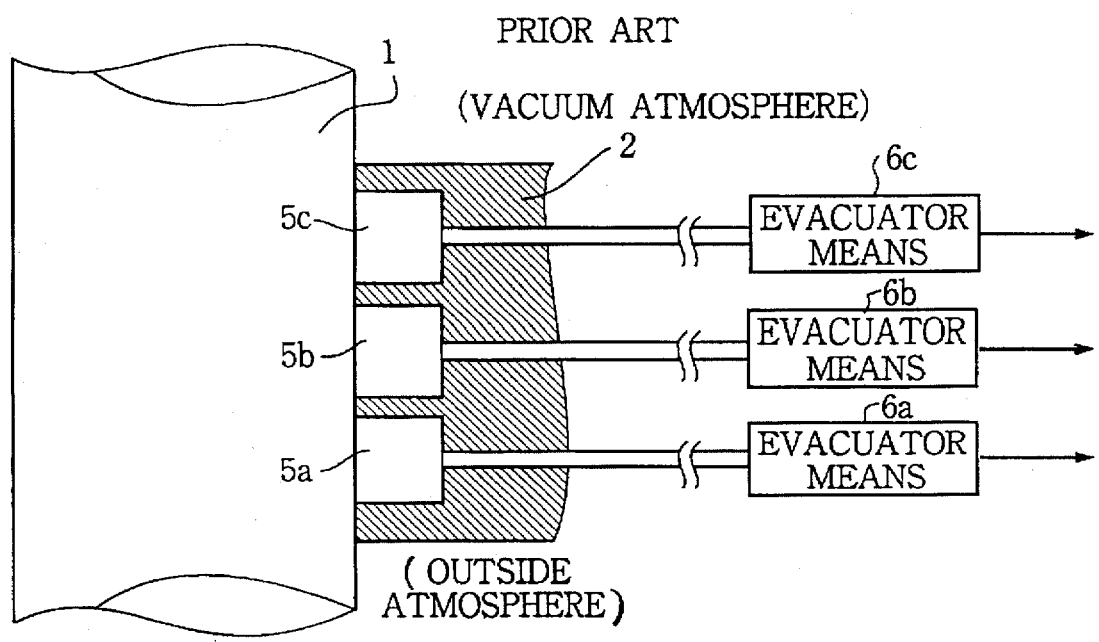
FIG. 5 is an enlarged schematic view illustrating a seal structure of another conventional information recording apparatus.

The protection circuit 56 will be described in detail with reference to FIG. 3. As indicated in FIG. 3, the protection circuit 56 includes a differential amplifier 56a, an absolute value calculating circuit 56b and a comparator 56c. The differential amplifier 56a receives a signal from a vacuum gauge 54 indicating a pressure within the pressure differential chamber 50, and another signal from a vacuum gauge 55 indicating a pressure within the vacuum chamber 10, calculates and produces an output indicating a difference between these two pressures. The absolute value circulating circuit 56b receives the output from the differential amplifier 56a so as to calculate and produce an absolute value. The comparator 56c compares the output from the absolute value circuit 56b with an threshold value 56d (corresponding to a pressure of 0.4 atmosphere). If an output from the absolute value calculating circuit 56b is less than the threshold value 56d, the comparator 56c produces a signal to close the valve 53. On the other hand, if an output from the absolute value calculating circuit 56b is larger than the threshold value 56d, the comparator 56c produces a signal to open the valve 53.

Here, the vacuum gauges 54 and 55 as well as the protection circuit 56 are constantly powered by a battery system so that they are effective even in an unpredictable service interruption (power source interruption). Further, the valve 53 is a normally-opened valve which will be in an opened position if it is out of drive control, thereby ensuring a safety for the vacuum system or even the whole recording apparatus. Moreover, since the magnetic fluid seal has a pressure resisting capability slightly less than 0.5 atmosphere, the threshold value 56d is set to be slightly less than this value but higher than a vacuum degree of 0.3 atmosphere (the evacuator means 6a can provide such a vacuum degree), and higher than a reference pressure difference (0.35 atmosphere) of the control circuit 57.

As understood from the above description, the valve 53 is closed when a pressure difference between the vacuum chamber 10 and the pressure differential chamber 50 is below the threshold value 56d which is slightly smaller than the pressure resisting capability of the magnetic fluid seal. Therefore, it is possible to adjust the pressure within the vacuum chamber 10 and the pressure within the pressure differential chamber 50 by properly opening or closing the valve 53, so as to properly maintain the above pressure difference below the above threshold value.

The information recording apparatus constructed in the above manner may be operated in the following way.

At first, the control circuit 57 is initialized, the valves 51 and 52 are opened, and the valve 53 is closed. Then, an master disc (not shown) is mounted and chucked on the turn table 14. Afterwards, the evacuator means 6a and 6b are energized to perform evacuating operation.

As soon as the pressure differential chamber 50 reaches a pressure of 0.35 atmosphere, the control circuit 57 actuates to close the valve 51 to temporarily stop the evacuation of the pressure differential chamber 50. Then, when the vacuum chamber 10 reaches the same pressure (0.35 atmosphere), the control circuit 57 actuates again to open the valve 51 so as to restart the evacuation of the pressure differential chamber 50. Such an operation is repeated until the pressure within the pressure differential chamber 50 reaches a vacuum degree having an absolute pressure of 0.3 atmosphere (a vacuum degree that can be achieved using a rotary pump), and until the pressure within the vacuum chamber 10 reaches a higher vacuum degree using a turbo molecular pump. Up to this, an atmosphere condition is reached where a desired information recording may be performed using an electronic beam.

Subsequently, while the vacuum chamber 10 is still being evacuated by the evacuator means 6d, the spindle motor 13 is operated to rotate the turn table 14 and master disc (not shown). Meanwhile, the master disc is linearly moved in a predetermined direction through the linear movement of the stage 12, so that information may be recorded on the surface of the master disc with the use of the electronic beam. During the process of such information recording, since the magnetic fluid seal has a thickness less than that of a magnetic fluid seal in a conventional apparatus, there is only a small viscosity resistance, thus there is not any difficulty for the spindle 1 to be rotated at a high speed. Further, since such a magnetic fluid 31 produces only a small amount of heat, neither the spindle 1 nor the housing 20 will suffer from any thermal deformation, thereby ensuring that information may be recorded with a high accuracy on the master disc.

If, during the above process of information recording, the evacuator means 6a is suddenly out of order, the evacuation operation of the pressure differential chamber 50 will be stopped. As a result, the outside atmosphere from the air bearing side will leak upwardly from the lower end of the spindle 1 into the pressure differential chamber 50 by way of gaps formed between the spindle 1 and the housing 20, causing a gradual increase in the internal pressure of the pressure differential chamber 50.

When the internal pressure of the pressure differential chamber 50 reaches a pressure of 0.4 atmosphere, the pressure difference between the pressure differential chamber 50 and the vacuum chamber 10 will be 0.4 atmosphere and such a pressure difference will be detected by the protection circuit 56. Then, the protection circuit 56 will actuate to open the valve 53, thus some air will move from the pressure differential chamber 50 into the vacuum chamber 10. After the internal pressure within the vacuum chamber 10 rises to some extent, the valve 53 is again closed. After such operation is repeated for a while, the internal pressure of the pressure differential chamber 50 will become close to the outside atmosphere, whilst the internal pressure of the vacuum chamber 10 will be lower than that of the pressure differential chamber 50 by an amount slightly less than 0.4 atmosphere.

After the evacuator means 6a is restored to its normal operating condition, the valve 53 is closed, the valves 51 and 52 are opened or closed appropriately so that the pressure difference between the vacuum chamber 10 and the pressure differential chamber 50 may be maintained at 0.35 atmosphere or less, whilst the interior of the vacuum chamber 10 will return to a high vacuum condition.

In this way, the information recording apparatus of the present invention is sure to operate not only under a normal condition, but also under an abnormal condition where an evacuator means is out of order, by maintaining under a threshold value the pressure difference between the vacuum chamber 10 and the pressure differential chamber 50.

As understood from the above description, the information recording apparatus according to the present invention may provide at least the following effects.

(1) Since the magnetic fluid seal is allowed to have only a small thickness, the spindle of the information recording apparatus can rotate with a greatly reduced resistance as compared with a conventional apparatus where only magnetic fluids are used as seals.

(2) Since fewer evacuator means are needed, the total cost for the information recording apparatus is lower than a conventional apparatus where only differential evacuator means are used as seals.

(3) The magnetic fluid seal may be prevented from breaking down by properly controlling the pressure difference between the vacuum chamber and the pressure differential chamber.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An information recording apparatus having a vacuum system, comprising:

a vacuum chamber connected with a first evacuator means;

an electronic beam producing means partially enclosed in the vacuum chamber for emitting an electronic beam for recording information on a recording medium;

a moving stage provided in the vacuum chamber for linearly moving the recording medium in a vacuum atmosphere within the vacuum chamber;

a spindle disposed in the vacuum chamber for rotating the recording medium, said spindle being rotatably driven by a spindle motor;

a magnetic fluid seal producing means provided around the spindle on the vacuum chamber side;

a pressure differential chamber provided around the spindle, said pressure differential chamber being connected with a second evacuator means;

a protection circuit responsive to a pressure within the vacuum chamber and a pressure within the pressure differential chamber, and the protection circuit controlling a first valve means connected between the vacuum chamber and the pressure differential chamber in order that a pressure difference between the vacuum chamber and the pressure differential chamber is constantly under a predetermined threshold value; and a control circuit responsive to a pressure within the vacuum chamber and a pressure within the pressure differential chamber, the control circuit controlling second and third valve means connected respectively with the vacuum chamber and the pressure differential chamber, such that a pressure difference between the vacuum chamber and the pressure differential chamber does not exceed a predetermined value.

2. The information recording apparatus according to claim 1, further comprising a first pressure detector means for detecting the pressure within the vacuum chamber, a second pressure detector means for detecting the pressure within the pressure differential chamber, said protection circuit being responsive to the above pressures and controlling these pressures so that the pressure difference between the vacuum chamber and the pressure differential chamber is constantly under the predetermined threshold value.

3. The information recording apparatus according to claim 2, wherein the predetermined threshold value is a value beyond which a magnetic fluid seal produced by the magnetic fluid seal producing means will be broken.

4. The information recording apparatus according to claim 1, wherein the first valve means connected between the vacuum chamber and the pressure differential chamber, is for allowing or stopping the communication between the vacuum chamber and the pressure differential chamber.

5. The information recording apparatus according to claim 1, wherein said control circuit controls the second and third valve means such that the pressure difference between the vacuum chamber and the pressure differential chamber does not exceed about 0.35 atmosphere.

6. The information recording apparatus according to claim 5, wherein the control circuit is provided to achieve a highly evacuated condition within the vacuum chamber by virtue of sequence control, while at the same time ensuring that a pressure difference between the vacuum chamber and pressure differential chamber does not exceed about 0.35 atmosphere.

* * * * *